(12) United States Patent
Lenchenkov et al.

(10) Patent No.: US 8,690,339 B2
(45) Date of Patent: Apr. 8, 2014

(54) COMPLETE DIGITAL HOLOGRAPHIC IMAGE SENSOR-PROJECTOR COMPUTING UNIT HAVING A MODULATOR FOR RECEIVING A FOURIER IMAGE

(75) Inventors: Victor Lenchenkov, Sunnyvale, CA (US); Dongqing Cao, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 344 days.

(21) Appl. No.: 13/161,903

(22) Filed: Jun. 16, 2011

(65) Prior Publication Data

US 2012/0274568 A1 Nov. 1, 2012

Related U.S. Application Data

(60) Provisional application No. 61/479,499, filed on Apr. 27, 2011.

(51) Int. Cl.
*G03B 21/26* (2006.01)

(52) U.S. Cl.
USPC ............... 353/28; 353/10; 353/30; 353/31; 353/98; 353/99; 359/1; 359/9; 359/10

(58) Field of Classification Search
USPC ........... 353/10, 28, 30, 31, 37, 46, 84, 88, 98, 353/99; 359/29, 30, 35, 559, 1, 9–10, 359/22–23; 348/49, 40, 744–747, 340, 348/E13.007, E13.019, E5.028
See application file for complete search history.

(56) References Cited

U.S. PATENT DOCUMENTS

| | | | |
|---|---|---|---|
| 6,062,693 A * | 5/2000 | Sato | 353/7 |
| 7,940,438 B2 | 5/2011 | Ogasawara | |
| 2007/0139541 A1* | 6/2007 | Fein et al. | 348/294 |
| 2007/0285554 A1* | 12/2007 | Givon | 348/340 |

* cited by examiner

*Primary Examiner* — Sultan Chowdhury
(74) *Attorney, Agent, or Firm* — Kendall P. Woodruff

(57) ABSTRACT

A hologram projecting system includes a coherent light source for emitting a reference beam onto a real object; and an image sensor for receiving the reference beam and a scattered beam reflected from the real object, and recording a Fourier image of the real object. Also included is a modulator for receiving the Fourier image. The reference beam is passed through the modulator, and configured to interact with the Fourier image to form a virtual image of the real object. The image sensor includes an n×m pixel array, where n and m are numbers of rows and columns, respectively. The modulator includes an n×m pixel array corresponding to the n×m pixel array of the image sensor. The pixels in the n×m pixel array of the image sensor control transmissivity of light in corresponding pixels of the n×m pixel array of the modulator.

20 Claims, 10 Drawing Sheets

COMPLETE DIGITAL HOLOGRAPHIC IMAGE SENSOR-PROJECTOR COMPUTING UNIT HAVING A MODULATOR FOR RECEIVING A FOURIER IMAGE

CROSS REFERENCE TO RELATED APPLICATIONS

This application claims priority of U.S. Provisional Patent Application Ser. No. 61/479,499, filed Apr. 27, 2011, which is incorporated herein by reference.

FIELD OF THE INVENTION

The present invention relates, in general, to holographic images and, more specifically, to recording and displaying an interaction of an object with a pre-recorded, or a digitally prepared interferogram of a holographic image.

BACKGROUND OF THE INVENTION

Various techniques for producing 3-D holographic images are well known but a brief explanation is included for the sake of completeness and for assisting in the reader's understanding of the present invention. Briefly, an object is illuminated by an object beam of coherent light from a laser source. An image recording medium, commonly a photographic plate is exposed to the object light reflected from the object. Simultaneously, a reference beam derived from the source, is directed on to the surface of the photographic plate. By careful arrangement of the apparatus, the coincidence of the object beam and the reference beam generates a pattern of interference fringes which record the intensity and phase of the wavefront of the object light. By developing the plate and illuminating the resulting interferogram using a reconstruction beam similar to the reference beam, a virtual or a real image of the object can be created.

Examples of a hologram recording apparatus and a hologram reading apparatus are disclosed in U.S. Pat. No. 7,940,438, issued on May 10, 2011, which is incorporated herein by reference in its entirety. For the sake of completeness, a portion of this patent is described below with reference to FIGS. 1, 2 and 3.

FIG. 1 is a diagram showing a hologram recording/reading (reproducing) apparatus 1. As shown, the hologram recording/reading apparatus 1 includes a light source 10, a shutter 12, a half wave plate 14, a polarizing plate 16, an enlarging/collimating optical system 18, a mirror 20, a polarization beam splitter 22, a spatial light modulator 24, lenses 26, 28 and Fourier transform lenses 30, 32 constituting a relay lens system. Also included are a filter 34, a Fourier transform lens 36 for focusing the light in a hologram recording medium 100, and a Fourier transform lens 38 for relaying transmitted light (reproduction light) transmitted through the hologram recording medium. Further included are a medium holding portion 40 for holding the hologram recording medium 100, Fourier transform lenses 42, 44 constituting a relay lens system, a filter 60 and a light receiving element 50.

The light source 10 irradiates coherent light acting as a light source for the signal light and the reference light. As coherent light, a light source such as a laser beam may be employed. As a laser beam, a wavelength (for example, a green laser) of 532 nm may be employed.

The laser beam passes through shutter 12, and through the half wave plate 14 and the polarizing plate. The laser beam, after being collimated, enters into polarization beam splitter 22. The polarization beam splitter 22 transmits p-polarized light of the incident laser beam and reflects s-polarized light. The laser beam reflected by the polarization beam splitter 22 enters into the spatial light modulator 24.

The spatial light modulator 24 polarizes and modulates the laser beam, in accordance with a pattern of recording information. The recording information is represented by a pattern image of bright and dark, in which digital data "0", "1" corresponds to "bright", "dark", respectively.

FIG. 2 shows an example of a configuration of the spatial light modulator 24. As shown, the spatial light modulator 24 is arranged to include a reference light pixel area 200 for modulating the reference light, and a signal light pixel area 300 for modulating the signal light. The signal light pixel area 300 is disposed at the center portion and the reference light pixel area 200 is disposed at the outer periphery.

Each of the reference light pixel area 200 and the signal light pixel area 300 is configured by a plurality of pixels and each of the pixels is intensity-modulated into bright or dark patterns. The painted pattern representing the "dark" pixels is differentiated between the reference light pixel area 200 and the signal light pixel area 300 merely for the sake of the explanation, and actually each of the color and pattern of the "dark" pixels is not differentiated.

The pixels contained in the signal light pixel area 300 generate a two-dimensional (2-D) image obtained by coding page data to be recorded and subjects the signal light to the spatial modulation. Also, the reference light pixel area 200 may generate a two-dimensional image obtained by coding a random pattern and subjects the reference light to the spatial modulation.

The spatial light modulator 24, as an example, is characterized in that the pitch of the pixels contained in the reference light pixel area 200 differs from the pitch of the pixels contained in the signal light pixel area 300. That is, the pitch of the pixels contained in the reference light pixel area 200 is d1 and the pitch of the pixels contained in the signal light pixel area 300 is d2; d1 is smaller than d2.

Recording light, including the signal light and the reference light, which is subjected to the spatial modulation by the spatial light modulator 24, is relayed by lenses 26, 28 and entered into the Fourier transform lens 30. The recording light is focused by the Fourier transform lens 30 and passed through filter 34. A frequency band of the recording light is cut when passing through filter 34.

The recording light, which is passed through filter 34, is converted into collimated light again by the Fourier transform lens 32 and entered into the Fourier transform lens 36 for focusing the recording beam in the hologram recording medium 100.

The hologram recording medium 100, which is held by the medium holding portion 40, forms a hologram (interference fringe) from the interference between the reference light and the signal light.

Next, when reading or reproducing the hologram, only the reference light is irradiated upon the hologram recording medium 100. The irradiated reference light is diffracted by the hologram and so reproduction light is obtained. The reproduction light obtained includes the reference light and the signal light irradiated at the time of forming the hologram.

FIG. 3 shows an example of the focal plane of the Fourier transform lens 42 disposed at filter 60. As shown, a 0-order DC component 400 of the signal light is located at the center of the Fourier transform plane, and primary-order DC components 410 of the signal light are located around the 0-order DC component. Further, primary-order DC components 510 of the reference light are located on the outside of the primary-order DC component of the signal light. In the example, a spot distance L1 of the reference light can be represented by Expression (1) and a spot distance L2 of the signal light can be represented by Expression (2), where d1 represents the pitch of the pixels of the reference light pixel area 200 and d2 represents the pitch of the pixels of the signal light pixel area 300 in spatial light modulator 24, f represents the focal distance of the lens, and λ represents the wavelength of the coherent light.

$$L1 = f\lambda/d1 \quad (1)$$

$$L2 = f\lambda/d2 \quad (2)$$

When filter 60 is configured as a low pass filter having a transmission portion with a radius r satisfying the relation of L2<r<L1 and is disposed at the Fourier transform plane, as shown in FIG. 3, the reference light can be cut from the reproduction light and only the signal light having the desired frequency band can be transmitted and extracted.

Having described examples of hologram recording and reproducing apparatus, including examples of a spatial light modulator and a Fourier image, the present invention will now be described below.

BRIEF DESCRIPTION OF THE FIGURES

The invention may be understood from the following detailed description when read in connection with the accompanying figures.

DETAILED DESCRIPTION OF THE INVENTION

The present invention uses a combination of an image sensor, a coherent light source and an LCD modulator to create, record and reproduce a free standing 3-D holographic image. Furthermore, the present invention provides an optical computing unit, in which a coherent reference beam is passed through a pre-recorded holographic interferogram (an LCD modulator array). In this manner, an object is made to interact with the pre-recorded holographic interferogram. This interaction forms a virtual 3-D image. As an example, the pre-recorded hologram may be a virtual computer keyboard and the interacting object may be a user's finger moving on the virtual keyboard.

As will be explained, the present invention also provides a feedback loop to record the interaction as input data into a computer or processor. For example, a holographic image of a computer keyboard may be pre-recorded or digitally prepared as an interferogram. Then, a user's finger may be moved into the virtual 3-D space of the hologram. The interaction results in light from the finger being scattered back into the image sensor, which may then be recorded an another hologram. Finally, this latter hologram may be compared to the pre-recorded hologram to identify whether a command should be triggered to identify the interaction between hitting a certain key on the virtual keyboard.

Figure 1:
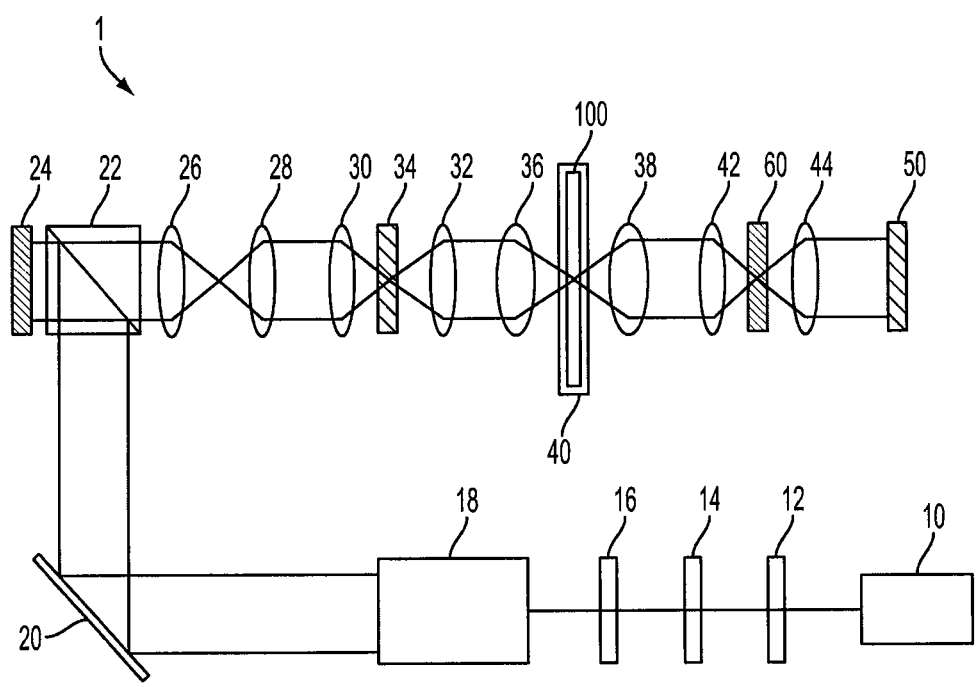
FIG. 1 is an example of a conventional hologram recording and reading apparatus.
Figure 2:
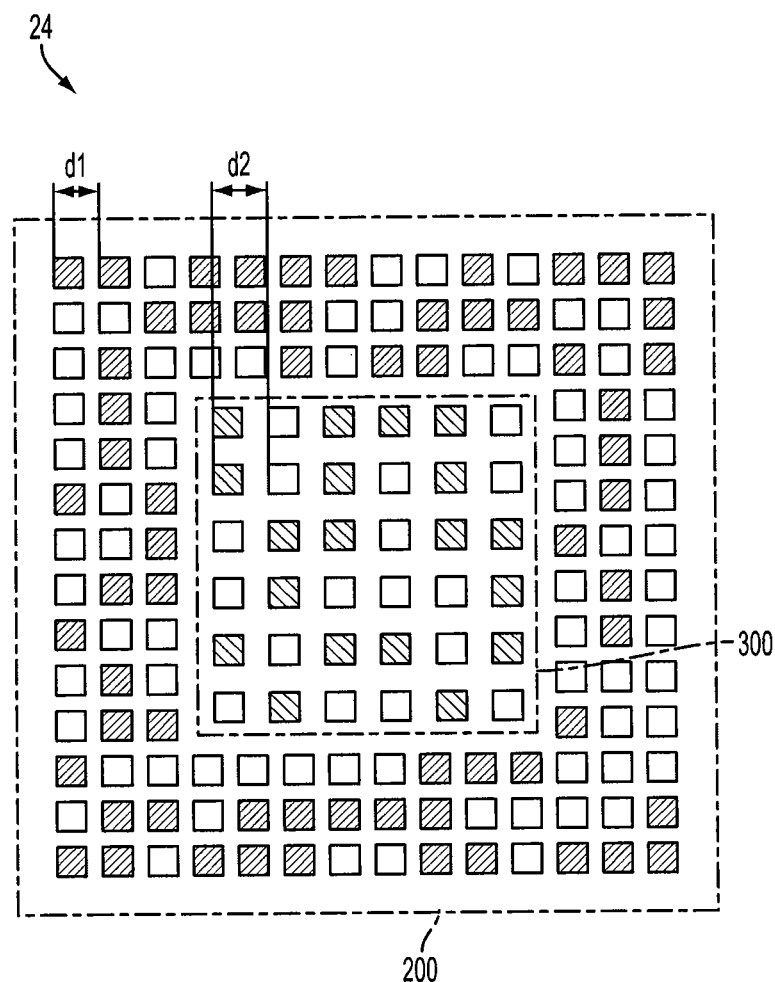
FIG. 2 is an example of a pattern in a spatial light modulator.
Figure 3:
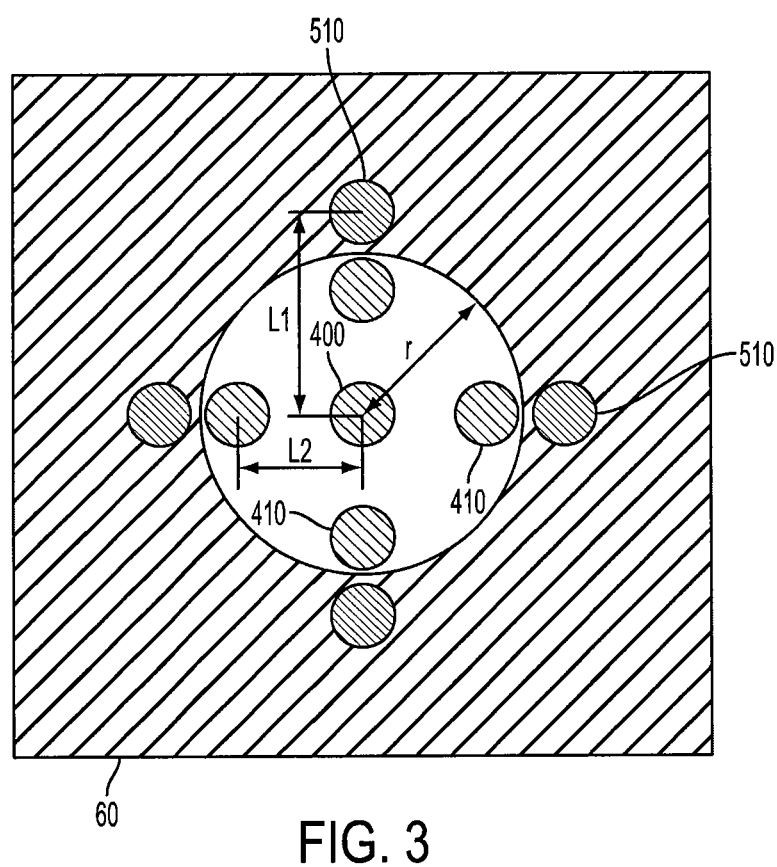
FIG. 3 is an example of a Fourier pattern resulting from the pattern in the modulator of FIG. 2.
Figure 4:
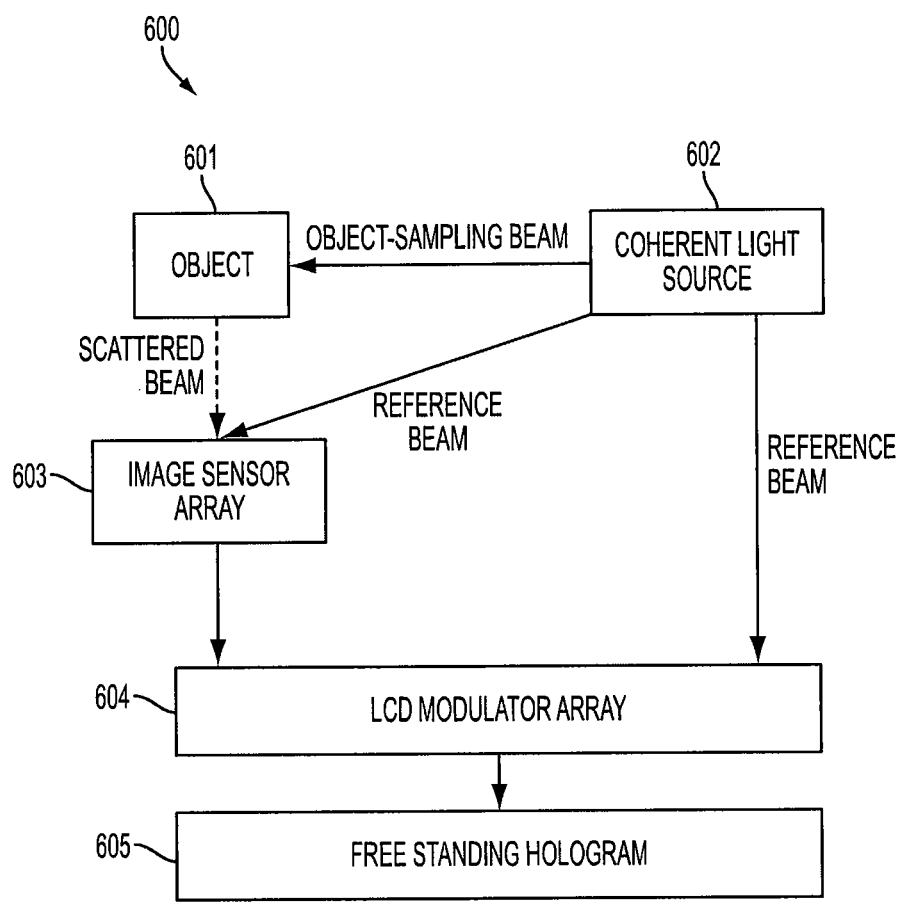
FIG. 4 is a block diagram of a holographic recorder and projector system, in accordance with an embodiment of the present invention.

Referring first to FIG. 4, there is shown a holographic image sensor-projector system, generally designated as 600. As shown, an object 601 is illuminated by light from a coherent light source 602. The coherent light source, for example, may be a laser generating a coherent light beam. The coherent light beam is split into two beams, namely an object-sampling beam and a reference beam. The object-sampling beam irradiates an object, generally designated as 601. Multiple points of object 601 reflect or re-emit light from light source 602 onto image sensor array 603. The light reflected or re-emitted from object 601, due to the object-reference beam, is referred to herein as a scattered beam.

Image sensor array 603 outputs multiple voltages (or intensity levels) corresponding to each pixel in an n×m pixel array that is irradiated by the reference and scattered beams. Each voltage i, j, where i, j corresponds to a location of a pixel in sensor array 603, is provided to a corresponding i, j pixel in an LCD modulator array, designated as 604.

When the same reference beam is passed through the LCD modulator, the modulator array transforms the image (which is a Fourier image) provided from image sensor array 603 into a free standing hologram, designated as 605. The free standing hologram is a holographic 3D image of object 601.

It will be appreciated that object 601 may be any object, which is recorded in the frequency plane of a camera lens, or at the back focal plane of the camera. When so recorded (or imaged), the object is translated into a Fourier image, or an interferogram of the object. Since the intensity from each pixel of sensor array 603 may be recalculated into intensity as a function of spatial frequency (with units of 1/mm) at the back focal plane of the camera, the image is referred to as a Fourier image and the back focal plane is referred to as the frequency plane.

Figure 5A:
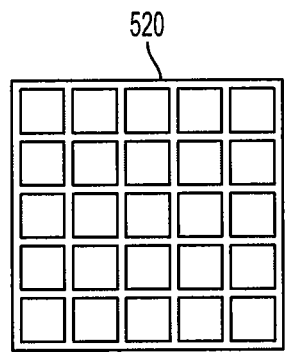
FIG. 5A is an example of an object having a grid pattern.
Figure 5B:
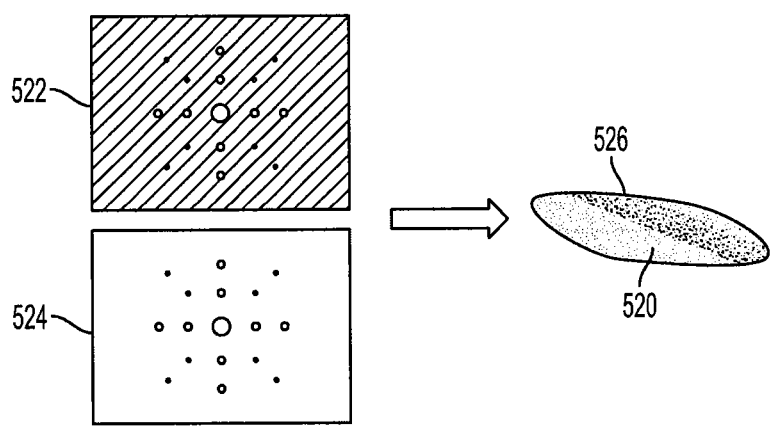
FIG. 5B is a pictorial of an interference pattern and a difference pattern formed from the object of FIG. 5A.

As an example of an object, FIG. 5A depicts a pattern of a grid, generally designated as 520. The Fourier image recorded in the frequency plane of the camera lens is shown in FIG. 5B as Fourier image 522. This is the image that is recorded when a photographic film or an image sensor is located in the frequency plane, or back focal plane of the camera.

Figure 6:
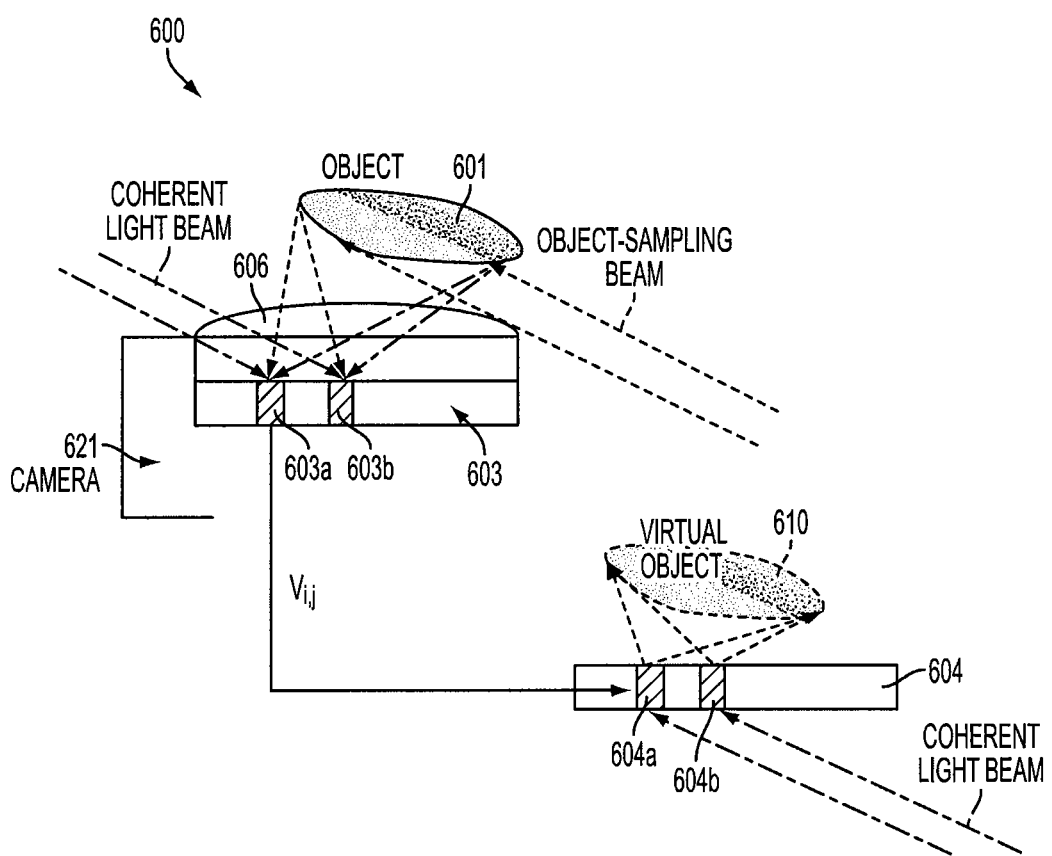
FIG. 6 is a pictorial of an image sensor obtaining a Fourier image of a real object and providing the Fourier image to a modulator in order to form a virtual image, in accordance with an embodiment of the present invention.

It will be understood that, in embodiments of the present invention, the image sensor may be placed anywhere after the camera lens, as best shown in FIG. 6. Moreover, the image sensor need not be located at the back focal plane of the camera. When located at the back focal plane of the camera or the frequency plane, however, Fourier image 522, shown in FIG. 5B, is formed. The Fourier image 522 is also referred to as a Fourier spectrum, an interferogram, or an interference pattern. The pattern includes dark and light points which represent pixel intensity as a function of spatial frequency.

It will be understood, however, that in a more general case, the lens need not be included in the present invention. A lens is not necessary, if the image sensor array is large enough to accommodate an image of a whole object of interest. In such a case, an interferogram may be formed by the interaction of the object-scattered beam and the reference beam.

In order to convert the Fourier image into a standard image that a user is accustomed to viewing, phase differences must be known between all possible light paths from all different points of an object. The phase differences are known, fortunately, if a coherent light source is used to irradiate the object. An example of a phase difference image is depicted as pattern 524 in FIG. 5B. When both Fourier image 522 and phase difference image 524 are inputted into a modulator array, a 3D image of an object may be formed as virtual object 526. Virtual object 526 may appear similar to grid pattern 520.

Referring now to FIG. 6, there is shown a pictorial view of a holographic image sensor projector system 600 (which is also shown in block diagram form in FIG. 4). As shown, system 600 includes camera 621 having lens 606 and image sensor 603. Also included in system 600 is LCD modulator 604. Object 601 is illuminated from a coherent light source (not shown) that emits a coherent light beam. The image sensor includes an array of pixels, two of which are shown as pixels 603a and 603b. Each pixel may be indexed as pixel i, j in the sensor array. Each pixel receives light from the coherent light source (not shown), referred to as the reference light beam; and light from the object, referred to as the scattered light beam. The light scattered from object 601 is reflected from every point on object 601 to every pixel i, j in the sensor array. Reflections from two different points of object 601 are shown in FIG. 6 as irradiating each pixel, such as pixel 603a and 603b.

Since image sensor 603 is located toward the back of lens 606 in the camera, the focal plane of the image sensor records a spot interferogram, or a Fourier transform of the image of object 601. This interferogram is formed by the interaction of the reference beam and the scattered light beam in the focal plane of image sensor 603.

Figure 8:
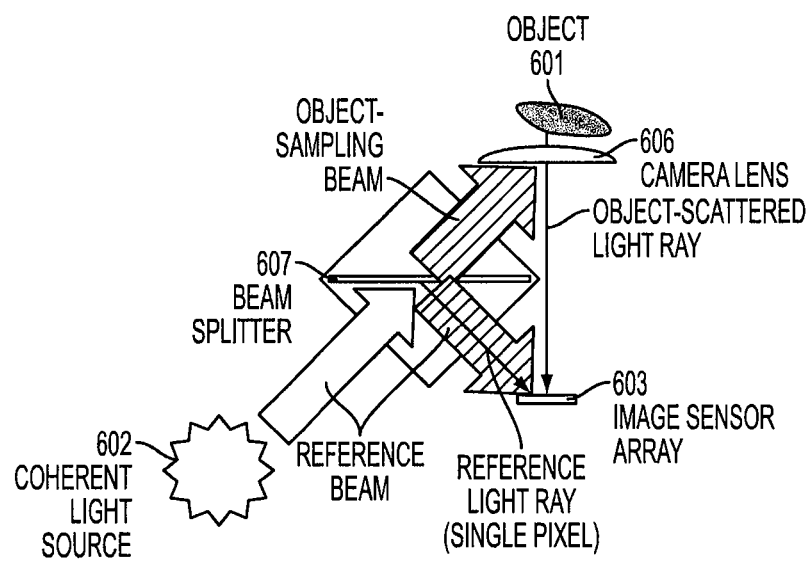
FIG. 8 is a pictorial of a beamsplitter used to obtain a split reference beam to form a Fourier image of an object, in accordance with an embodiment of the present invention.

It will be appreciated that coherence between the reference beam and the scattered beam may be achieved in multiple ways. For example, a single beam approach, or a beamsplitting approach from the same source may be used. An example of a beamsplitting approach is shown in FIG. 8.

Still referring to FIG. 6, the signals from the image sensor array (for example, signal Vi,j from pixel 603a) are transferred into a corresponding pixel array in LCD modulator 604. For example, two pixels are shown in LCD modulator 604, namely pixel 604a and 604b. It will be understood that the i, j locations of pixels 603a and 603b in image sensor 603 correspond to the i, j locations of pixels 604a and 604b, respectively, in LCD modulator 604. Thus, the i, j indices in array 603 matches the i, j indices in the array of LCD modulator 604, where i and j index row and column positions, respectively, of the pixels in both arrays.

The signals Vi, j from the array of image sensor 603 are transferred into LCD modulator 604. The array of LCD modulator 604 modulates the incoming Vi, j signals. The modulation may be accomplished, for example, by setting each pixel i, j in the modulator array to be ON (i.e. transmittance set to 1) or OFF (i.e. transmittance set to 0), by a corresponding incoming voltage Vi, j from the array of image sensor 603. The manner in which the array of image sensor 603 controls the light transmission of LCD modulator 604 is explained later with reference to FIGS. 9A and 9B.

Still referring to FIG. 6, LCD modulator 604 transforms the interferogram formed by image sensor 603 back into object 601 by providing a holographic 3-D image of object 601 to a viewer. The object is shown as virtual object 610. In order to transform the Fourier image into the virtual image (a view of the virtual object), the present invention passes the same reference light beam (shown as the coherent light beam) through LCD modulator 604. The transformation of a Fourier image into a virtual image, by passing a reference coherent beam through an LCD modulator, is referred to herein as an optical computing operation.

Figure 7:
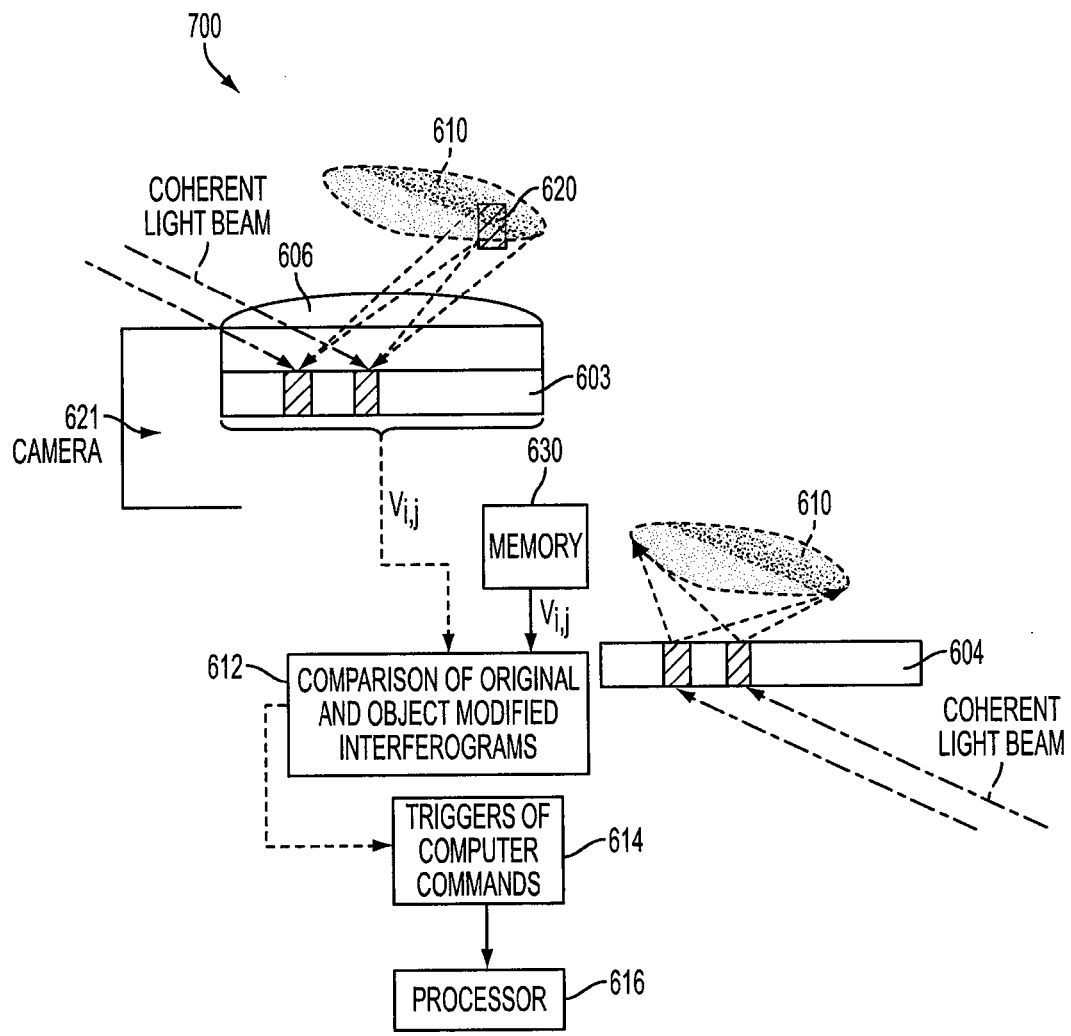
FIG. 7 is a block diagram of a comparator unit comparing the Fourier image of a real object with a Fourier image formed by the interaction of a real object in the space of a virtual image, in accordance with an embodiment of the present invention.

Referring next to FIG. 7, there is shown a system for recording and projecting an interaction between an object and a pre-recorded, or digitally prepared interferogram of a holographic 3-D image, the system generally designated as 700. As shown, the system includes camera 621, LCD modulator 604 and comparator 612, the latter configured to provide a trigger command 614 to processor 616.

As described before, camera 621 includes lens 606 and image sensor 603. Although not shown, it will be understood that camera 621 includes other conventional components, such as analog-to-digital converters (ADCs), image processors and storage memories for processing and outputting image signals Vi, j (which may be digitally formatted signals).

In operation, system 700 uses camera 621 to record an interferogram (Fourier image) of object 601 (FIG. 6), without object 620 placed within the field-of-view of object 601. This provides a recorded interferogram of object 601. The recorded interferogram may be inputted into LCD modulator 604 to transform the recorded interferogram into virtual image 610 by passing a reference coherent beam through the modulator. This process has been described with reference to FIG. 6.

It will be understood that the interferogram may be recorded by image sensor 603, pre-recorded by image sensor 603, or generated separately from image sensor 603. For example, the interferogram may be generated by a computer program as a CGH (computer generated hologram). In this manner, virtual image 610 may be generated by LCD modulator 604.

Next in the operation, a real object is placed within the field-of-view of virtual image 610. This real object, which is designated as 620, now interacts with virtual image 610.

The interaction between real object 620 and virtual image 610 is recorded by camera 621. In actuality, camera 621 records an interferogram of real object 620 and its surroundings. Thus, another interferogram (or Fourier image) is formed. Two interferograms now exist, one of real object 601 and another of real object 620, the latter located within the field-of-view of virtual object 610.

Next in operation, the voltages or signals, Vi, j from each pixel, of the two interferograms (first and second) are sent to a comparator unit 612. In one embodiment, the comparator unit includes multiple comparators, so that the pixels representing the signal intensities of the first interferogram may be compared, respectively, to the pixels representing the signal intensities of the second interferogram. As already described, the first interferogram of real object 601 may be pre-recorded and stored in a memory, for example, memory 630.

The resulting difference between the first and second interferograms triggers computer commands from trigger unit 614. These computer commands may be sent to a processor, for example, an image processor in camera 621, for activating various functions. For example, the first interferogram may be a Fourier image of a computer keyboard; the second interferogram may be a Fourier image of a finger striking a particular key on the keyboard. The computer command may then activate the function of the struck key.

Figure 10:
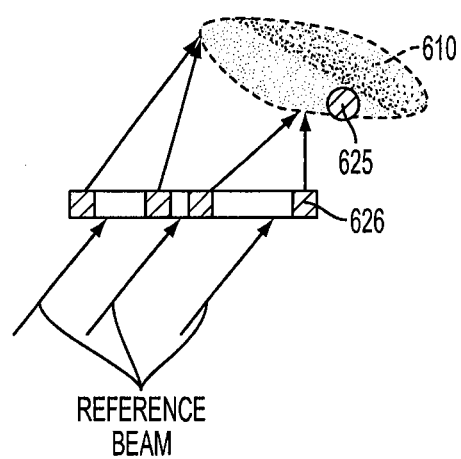
FIG. 10 is an example of a pre-recorded hologram forming a virtual computer keyboard and a user's finger brought into the field of view of the virtual computer keyboard to form an interaction between the virtual computer keyboard and the finger, in accordance with an embodiment of the present invention.

As an example, FIG. 10 shows the interaction between a virtual image 610 (a keyboard) and a real image of a finger 625. the virtual image 610 is formed, as previously explained, by shining a reference coherent beam through a digitally prepared, or pre-recorded interferogram/holographic mask (first interferogram) in LCD modulator 626. The mask may be dark and light spots representing the code of a computer keyboard. The light shining through the mask forms the virtual 3-D image of keyboard 610.

When the real finger 625 enters the field-of-view of virtual keyboard 610, the finger disturbs the original holographic/background interference pattern represented by image 610. The image sensor (603 in FIG. 7) records this disturbance, thereby forming the second interferogram. A direct comparison of the first and second interferograms by comparator unit 612, allows the processor 616 to identify which key has been pressed. Tolerances for hitting the key may be pre-set in the processor.

In order to complete the description of the present invention, FIGS. 8 and 9 will now be described. Referring first to FIG. 8, there is shown an example of an embodiment of the present invention. As shown, beamsplitter 607 is used to split the coherent reference beam from light source 602. One reference beam (wide arrow) illuminates object 601 and the other reference beam (wide arrow with a narrow line) illuminates image sensor array 603. (For explanation purposes, the reference beam illuminating object 601 is erroneously shown as impinging upon camera lens 606. Of course, a mirror(s) in the light path may move the beam, so it correctly impinges upon object 601.) The object-scattered light ray is also depicted as interacting with the reference beam at the focal plane of camera 621.

For the present invention, image sensor array 603 may be located anywhere in the back of camera lens 606. It need not be placed at the exact frequency plane of the camera.

Figure 9A:
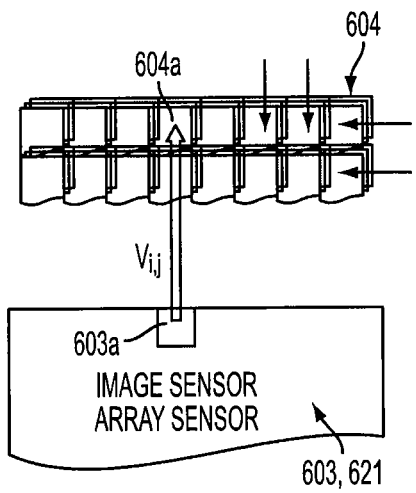
FIG. 9A is a pictorial of a pixel in an array of an image sensor controlling the transmission of light through a corresponding pixel in an array of an LCD modulator, in accordance with an embodiment of the present invention.
Figure 9B:
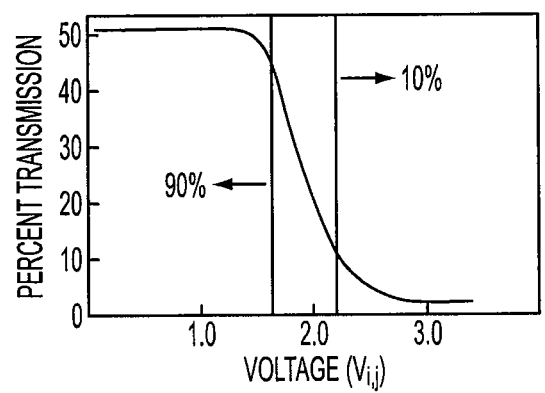
FIG. 9B is a plot of transmission versus voltage used by the image sensor to control the transmission of the LCD modulator shown in FIG. 9A, in accordance with an embodiment of the present invention.

Referring lastly to FIGS. 9A and 9B, an example is provided of how to change the transmission of the pixel array in LCD modulator 604. As shown, the voltages (only one shown as Vi, j from pixel 603a of image sensor 603) from the pixels of image sensor 603 drive corresponding pixels in the LCD pixel array of LCD modulator 604 (only one shown as pixel 604a of LCD modulator 604). The virtual image is formed by the interaction of the object-scattered beam with the reference beam in the LCD modulator. By passing the reference beam through the interference pattern formed in the LCD array, the virtual image (hologram) is formed in front of the LCD modulator.

When the voltage, Vi, j from the image sensor are applied to corresponding pixels in the LCD modulator, the amount of transmissivity of the LCD modulator depends on the respective voltage level Vi, j, as shown in the graph of FIG. 9B.

It will be understood that, in general, as described with respect to a lens of a camera, a lens need not be included in the present invention for the LCD modulator. A lens is not necessary, if the sensor array of the LCD modulator is large enough to accommodate an image of a whole object of interest.

Accordingly, the following combinations for the present invention may be possible:

a. Lenses used in front of both, the camera and the LCD modulator;

b. no lenses used in front of the camera and the LCD modulator;

c. a lens used in front of the camera, but not in front of the LCD modulator;

d. a lens used in front of the LCD modulator, but not in front of the camera.

Having described an example of the use of the present invention, by way of an interaction between a user's finger and a computer keyboard, it will be understood that the present invention contemplates other uses. These uses may include any interaction between a pre-recorded virtual image and a real object, where the latter is brought within the field-of-view of a camera viewing the virtual and real objects.

The advantages of the present invention includes providing a feedback mechanism in which disturbance of a hologram may be decoded, or interpreted with minimal computations. Of course, in the keyboard example, the computer display and the computer keyboard may be eliminated for the purpose of entering and reproducing information, with minimal computation.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A hologram projecting system comprising:
   a coherent light source for emitting a reference beam onto a real object,
   an image sensor for receiving the reference beam and a scattered beam reflected from the real object, and recording a Fourier image of the real object, and
   a modulator for receiving the Fourier image, wherein the reference beam is passed through the modulator, and configured to interact with the Fourier image to form a virtual image of the real object.

2. The hologram projecting system of claim 1 wherein the image sensor includes an n×m pixel array, where n and m are numbers of rows and columns, respectively, and the image sensor forms a portion of a camera unit.

3. The hologram projecting system of claim 2 wherein the modulator includes an n×m pixel array corresponding to the n×m pixel array of the image sensor, and pixels in the n×m pixel array of the image sensor control transmissivity of light in corresponding pixels of the n×m pixel array of the modulator.

4. The hologram projecting system of claim 3 wherein the modulator includes an LCD modulator, and a voltage provided from pixel i,j, where i and j are row and column locations of the pixel, respectively, controls the transmissivity of the light through the LCD modulator.

5. The hologram projecting system of claim 1 wherein the coherent light source includes a laser generating source.

6. The hologram projecting system of claim 1 wherein the image sensor is located at a back position of a macro lens that forms a portion of a camera unit.

7. The hologram projecting system of claim 6 wherein the image sensor is located adjacent to a frequency plane of the camera unit, and the frequency plane is a focal plane for forming an interference pattern of the real object.

8. The hologram projecting system of claim 1 wherein a beamsplitter is configured to transmit the reference beam onto the real object and transmit the reference beam onto the image sensor.

9. The hologram projecting system of claim 1 further comprising:
a second real object placed within a field of view of the image sensor, wherein the real object is defined as the first real object,
the second real object is configured to interact with the virtual image of the first object,
the image sensor is configured to record a second Fourier image of the second real object interacting with the virtual image, wherein the Fourier image of the first real object is defined as the first Fourier image,
a comparator unit configured to compare the first and second Fourier images, and
a triggering unit for providing commands to a processor in response to comparisons performed by the comparator unit.

10. The hologram projecting system of claim 9 wherein the first real object includes a computer keyboard, and the second real object includes a finger of a user configured to hit a key in the computer keyboard.

11. An optical computing system comprising:
a modulator for receiving a pre-recorded hologram of a first real object,
the modulator configured to project a first holographic image of the first real object, when a coherent reference light is passed through the modulator,
an image sensor configured to receive the coherent reference beam and a scattered beam reflected from a second real object interacting with the first holographic image,
the image sensor configured to output holographic signals of the second real object interacting with the first holographic image,
a comparator unit configured to compare the holographic signals outputted from the image sensor with the pre-recorded hologram, and
the comparator unit configured to provide computer commands to a processor, in response to comparisons made by the comparator unit.

12. The optical computing system of claim 11 wherein
the image sensor includes an n×m pixel array, where n and m are numbers of rows and columns, respectively, and
the modulator includes an n×m pixel array corresponding to the n×m pixel array of the image sensor, and
pixels in the n×m pixel array of the image sensor control transmissivity of light in corresponding pixels of the n×m pixel array of the modulator.

13. The optical computing system of claim 11 wherein the coherent reference beam is generated by a coherent light source.

14. The optical computing system of claim 13 wherein the coherent light source includes a laser generating source.

15. The optical computing system of claim 11 wherein the image sensor is located at a back position of a macro lens that forms a portion of a camera unit.

16. The optical computing system of claim 11 wherein the first real object includes a computer keyboard, and the second real object includes a finger of a user configured to hit a key in the computer keyboard.

17. A method of determining an interaction of a real object with a holographic image, comprising the steps of:
modulating a pre-recorded hologram to form a holographic image;
interacting the real object with the holographic image;
imaging the interaction of the real object with the holographic image to form a Fourier image;
comparing the Fourier image with the holographic image; and
triggering computer commands in response to the comparison between the Fourier image and the holographic image.

18. The method of claim 17 including the step of:
splitting a coherent beam to form first and second coherent beams, wherein the first coherent beam provides a reference beam when interacting the real object with the holographic image, and the second coherent beam provides a reference beam when imaging the interaction of the real object with the holographic image.

19. The method of claim 17 wherein imaging includes placing a pixel array adjacent to a back focal plane of a macro lens and forming a spatial frequency pattern of the interaction.

20. The method of claim 17 wherein interacting the real object with the holographic image includes interacting a user's finger with a computer keyboard.

* * * * *